United States Patent
Abe

(10) Patent No.: US 10,243,685 B2
(45) Date of Patent: Mar. 26, 2019

(54) EXTENDED BRANCHING DEVICE AND CONTROL METHOD OF THE SAME

(71) Applicant: NEC CORPORATION, Tokyo (JP)

(72) Inventor: Ryota Abe, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/556,518

(22) PCT Filed: Mar. 9, 2016

(86) PCT No.: PCT/JP2016/001279
§ 371 (c)(1),
(2) Date: Sep. 7, 2017

(87) PCT Pub. No.: WO2016/147610
PCT Pub. Date: Sep. 22, 2016

(65) Prior Publication Data
US 2018/0054271 A1    Feb. 22, 2018

(30) Foreign Application Priority Data

Mar. 16, 2015 (JP) ................... 2015-051828

(51) Int. Cl.
*H04J 14/02* (2006.01)
*H04B 10/29* (2013.01)
(Continued)

(52) U.S. Cl.
CPC ...... *H04J 14/0212* (2013.01); *G02B 6/29367* (2013.01); *H04B 10/29* (2013.01);
(Continued)

(58) Field of Classification Search
CPC .. H04J 14/0212; H04J 14/0216; H04J 14/022; H04B 10/29
See application file for complete search history.

(56) References Cited

U.S. PATENT DOCUMENTS 5,771,112 A    6/1998 Hamel et al.
6,038,046 A *  3/2000 Kaneko ............... H04J 14/0201
                                                      398/1
(Continued)

FOREIGN PATENT DOCUMENTS

JP    10-209965 A    8/1998
JP    11-127111 A    5/1999
(Continued)

OTHER PUBLICATIONS

International Search Report for PCT/JP2016/001279 dated May 17, 2016 [PCT/ISA/210].
(Continued)

*Primary Examiner* — Dzung D Tran
(74) *Attorney, Agent, or Firm* — Sughrue Mion, PLLC

(57) ABSTRACT

In order to provide an extended branch device in which construction work is easy and communication is not significantly affected by construction work, and a method for controlling the extended branch device, the extended branch device of the present invention is provided with: a first branch unit provided with a first port coupled to a first terminal station, a second port coupled to a second terminal station, a third port, a fourth port, and a switch for coupling the first port with the second or third port and coupling the second port with the fourth port; and a first separation unit provided with a fifth port coupled to the third port, a sixth port coupled to the fourth port, and a seventh port coupled to a third terminal station, the first separation unit outputting, from the sixth port, an optical signal having a first wavelength among the optical signals inputted from the fifth port, and outputting, from the seventh port, an optical signal having a second wavelength among the optical signals inputted from the fifth port. The extended branch device is
(Continued)

further provided with a second branch unit configured so as to be separable from the first branch unit.

15 Claims, 7 Drawing Sheets

(51) Int. Cl.
    *G02B 6/293*     (2006.01)
    *H04B 10/61*     (2013.01)

(52) U.S. Cl.
    CPC .......... *H04B 10/614* (2013.01); *H04J 14/022* (2013.01); *H04J 14/0209* (2013.01); *H04J 14/0216* (2013.01); *H04J 14/0219* (2013.01)

(56) References Cited

U.S. PATENT DOCUMENTS

| | | | |
|---|---|---|---|
| 6,907,159 B1 | 6/2005 | Daniel | |
| 2002/0191899 A1* | 12/2002 | Kelly | H04J 14/0209 385/24 |
| 2006/0171717 A1* | 8/2006 | Kikuchi | H04J 14/0206 398/83 |
| 2007/0003283 A1* | 1/2007 | Feuer | H04B 10/2503 398/83 |
| 2008/0002978 A1 | 1/2008 | Onaka et al. | |
| 2015/0349879 A1* | 12/2015 | Satou | H04B 10/032 398/5 |

FOREIGN PATENT DOCUMENTS

| | | |
|---|---|---|
| JP | 2000-68933 A | 3/2000 |
| JP | 2007-67944 A | 3/2007 |
| JP | 2011-77808 A | 4/2011 |
| JP | 2012527189 A | 11/2012 |
| WO | 03084280 A1 | 10/2003 |

OTHER PUBLICATIONS

Written Opinion for PCT/JP2016/001279 dated May 17, 2016 [PCT/ISA/237].

Communication dated Feb. 26, 2018 from the European Patent Office in counterpart European application No. 16764443.4.

Communication dated Nov. 13, 2018 from the Japanese Patent Office in application No. 2017-506070, Machine Translation.

* cited by examiner

EXTENDED BRANCHING DEVICE AND CONTROL METHOD OF THE SAME

CROSS REFERENCE TO RELATED APPLICATIONS

This application is a National Stage of International Application No. PCT/JP2016/001279, filed on Mar. 9 2016, which claims priority from Japanese Patent Application No. 2015-051828, filed on Mar. 16 2015, the contents of all of which are incorporated herein by reference in their entirety.

TECHNICAL FIELD

The present invention relates to an extended branching device and a control method of an extended branching device, and, more particularly, to an extended branching device and a control method thereof for use in a submarine cable system.

BACKGROUND ART

Along with development of international communication, submarine cable systems in which an optical fiber is used as a transmission line have been also enlarged. In a submarine cable system, a branching device installed on the bottom of the sea is used in order to connect a plurality of terminal stations installed on land with each other. The branching device connects transmission lines including a plurality of submarine cables with each other according to predetermined specifications such as a wavelength. On the other hand, communication devices that are used in a submarine cable system are becoming more highly functional year by year. For this reason, there are cases where engineering work for replacing a branching device to something more highly functional is needed after the system has become operational.

Further, there are cases where the specifications for connection between terminal stations connected to a branching device is changed after the system has become operational, as well as cases where a newly-installed terminal station is connected to the branching device. When such specification change or connection of a terminal station becomes necessary, there is a need to bring up the branching device to which the terminal station is connected from the bottom of the sea, and perform engineering work for making the specification of the branching device conform to the specification of a terminal station to be changed or newly installed. Then, at the time of engineering work of the branching device, it is necessary to halt the operation of the submarine cable system to perform replacement work of the branching device.

In relation to the present invention, patent literature 1 discloses a light signal branching device for use in a transmission line of a wavelength division multiplexing (WDM) light signal.

CITATION LIST

Patent Literature

[PTL 1] Japanese Patent Application Laid-Open No. 1999-127111 (paragraph [0007] and FIG. 7)

SUMMARY OF INVENTION

Technical Problem

For change of the specifications of a branching device or addition of a terminal station, the branching device needs to be brought up from the bottom of the sea. For this reason, there is an issue that a cost of engineering work of the branching device is high. There is also an issue that it is needed to suspend communication services that use a transmission path which passes the branching device during the engineering work period of the branching device.

For example, in patent literature 1, a first branching device (BU-2) that connects an optical transmission/reception terminal station I and an optical transmission/reception terminal station II is provided with a separation circuit and an insertion circuit having wavelength characteristics. For this reason, in order to change the function of the first branching device, it is necessary to bring up the first branching device and perform engineering work. Therefore, whole communication which passes the first branching device, including communication between the optical transmission/reception terminal station I and optical transmission/reception terminal station II, needs to be suspended during the engineering work period.

Object of Invention

An object of the present invention is to provide an extended branching device and a control method of an extended branching device that facilitate engineering work and reduce influence of the engineering work on communication.

Solution to Problem

An extended branching device of the present invention includes: a first branching unit including a first port connected to a first terminal station, a second port connected to a second terminal station, a third port, a fourth port, and a switch to connect the first port to one of the second port and the third port and connect the second port to the fourth port; and a second branching unit including a fifth port connected to the third port, a sixth port connected to the fourth port, a seventh port connected to a third terminal station, and a first separating unit for outputting, from the sixth port, a light signal of a first wavelength among light signals inputted from the fifth port, and outputting, from the seventh port, a light signal of a second wavelength among the light signals inputted from the fifth port, wherein the second branching unit is configured to be separable from the first branching unit.

A control method of an extended branching device of the present invention includes: in a first branching unit, connecting a first port to one of a second port and a third port, the first port being connected to a first terminal station, the second port being connected to a second terminal station; and connecting the second port to a fourth port; and, in a second branching unit that is configured to be separable from the first branching unit, outputting, from a sixth port, a light signal of a first wavelength among light signals inputted from the a fifth port, the fifth port being connected to the third port, from a the sixth port being connected to the fourth port; and outputting, from a seventh port, a light signal of a second wavelength among the light signals inputted from the fifth port, the seventh port being connected to a third terminal station.

A program of an extended branching device of the present invention causes a computer of an extended branching device including a first branching unit and a second branching unit to achieve, in the first branching unit, a function to connect a first port to one of a second port and a third port, the first port being connected to a first terminal station, the second port being connected to a second terminal station, and a function to connect the second port to a fourth port; and, in a second branching means that is configured to be separable from the first branching means, a function to output from a sixth port a light signal of a first wavelength among light signals inputted from the fifth port, the fifth port being connected to the third port, the sixth port being connected to the fourth port, and a function to output from a seventh port a light signal of a second wavelength among the light signals inputted from the fifth port, the seventh port being connected to a third terminal station.

Advantageous Effects of Invention

An extended branching device and a control method of an extended branching device of the present invention have an effect of facilitating engineering work and reducing influence of the engineering work on communication is small.

DESCRIPTION OF EMBODIMENTS

First Example Embodiment

Figure 1:
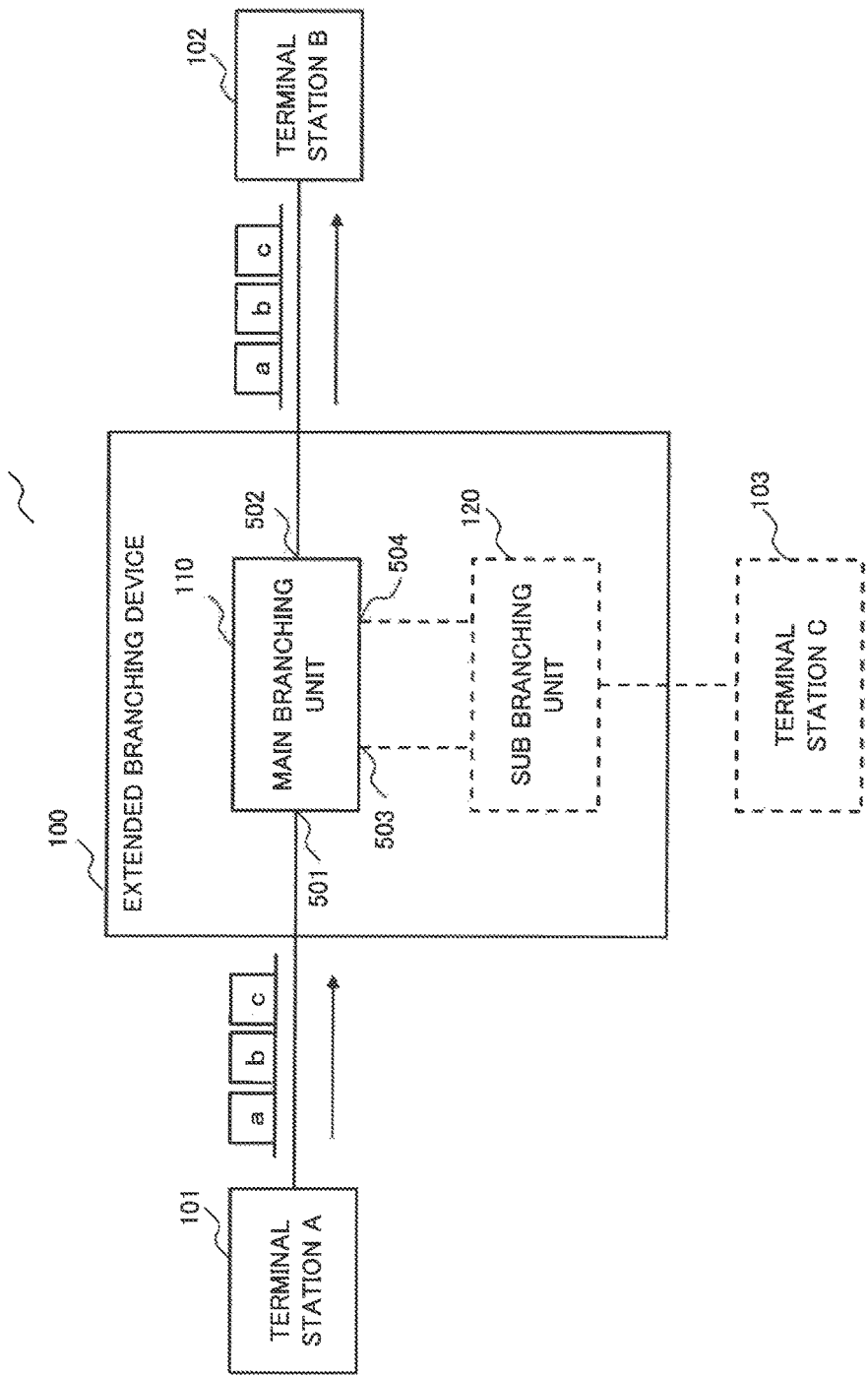
FIG. 1 is a block diagram illustrating an exemplary configuration of a submarine cable system 10 of the first example embodiment.
Figure 2:
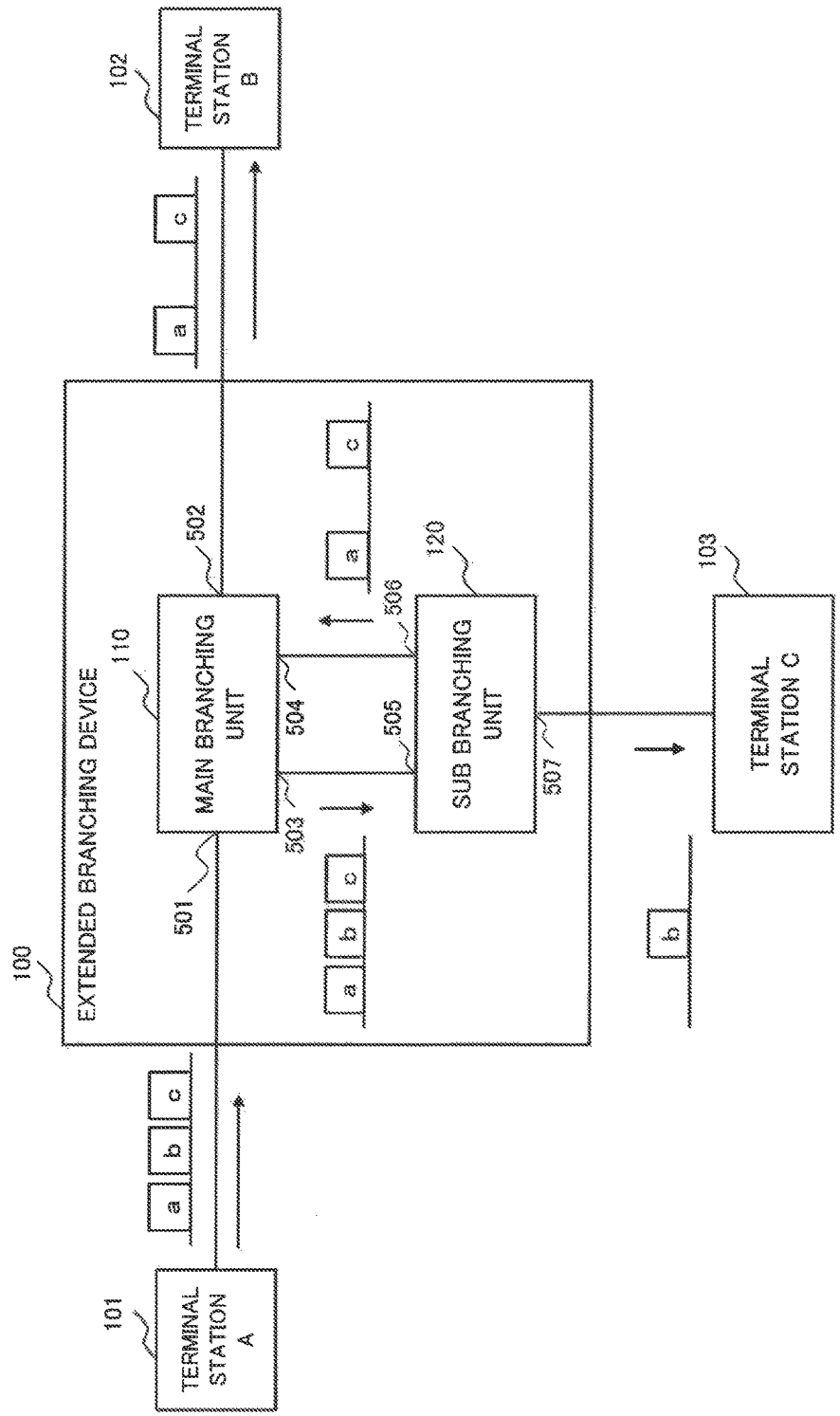
FIG. 2 is a block diagram illustrating an exemplary configuration of the submarine cable system 10 of the first example embodiment.

FIG. 1 and FIG. 2 are block diagrams illustrating exemplary configurations of the submarine cable system 10 of the first example embodiment of the present invention. The submarine cable system 10 includes an extended branching device 100, a terminal station A 101, a terminal station B 102 and a terminal station C 103. The terminal station A 101, the terminal station B 102 and the terminal station C 103 are optical transmitting and receiving devices which transmit and receive a wavelength division multiplexing light signal (hereinafter, referred to as "WDM signal"), and transmit data such as sound and the like between them via the extended branching device 100.

The extended branching device 100 includes a main branching unit 110 and a sub branching unit 120. The main branching unit 110 inputs and outputs a light signal to and from ports 501-504. The main branching unit 110 has a function to change inner connections between the ports 501-504. The terminal station A 101 is connected to the port 501 of the main branching unit 110 by a submarine optical cable. The terminal station B 102 is connected to the port 502 of the main branching unit 110 by a submarine optical cable. The main branching unit 110 relays communication between the terminal station A 101 and the terminal station B 102.

Operations of the submarine cable system 10 will be described with reference to FIG. 1. FIG. 1 indicates a case where the sub branching unit 120 and the terminal station C 103 are not in operation. In FIG. 1, the sub branching unit 120 is separated from the main branching unit 110. The terminal station A 101 transmits a WDM signal including the respective light signals of wavelengths a, b, and c to the port 501 of the main branching unit 110. Wavelengths a, b and c are different wavelengths from each other. In block diagrams below, wavelengths included in a light signal are indicated schematically such as a, b, and c in the neighborhood of an optical path. When the terminal station C 103 is not in operation, routes inside the main branching unit 110 are set in such a way that all WDM signals transmitted from the terminal station A 101 are transmitted to the terminal station B 102. The main branching unit 110 may set inner routes using optical switches.

Next, operations of the extended branching device 100 when the terminal station C 103 is connected to the main branching unit 110 via the sub branching unit 120 will be described with reference to FIG. 2. FIG. 2 indicates a case where the sub branching unit 120 and the terminal station C 103 are in operation. The sub branching unit 120 inputs and outputs a light signal to and from ports 505-507. The ports 505 and 506 of the sub branching unit 120 are connected to the ports 503 and 504 of the main branching unit 110, respectively.

In FIG. 2, the main branching unit 110 sets inner routes in such a way that light signals of all wavelengths inputted to the port 501 are outputted from the port 503. Further, the main branching unit 110 sets the inner routes in such a way that light signals of all wavelengths inputted to the port 504 are outputted from the port 502. The block having the function to set a route inside the main branching unit 110 that have been described in FIG. 1 and FIG. 2 may be called "switch".

The paths between the port 503 and the port 505 and between the port 504 and the port 506 may be connected to an electric circuit for supervisory control or for feeding power, in addition to the optical transmission path. Alternatively, the main branching unit 110 and the sub branching unit 120 may be mounted on different chassis, and the paths between the port 503 and the port 505 and between the port 504 and the port 506 may be connected by submarine cables which can transmit a light signal and supplied power. Further, alternatively, the terminal station C 103 may supply power to the sub branching unit 120 via a submarine cable, and the sub branching unit 120 may supply power to the main branching unit 110.

The sub branching unit 120 outputs a light signal inputted to the port 505 or 506 from the other port according to specifications set for each wavelength. Hereinafter, a case where a WDM signal transmitted from the terminal station A 101 is inputted to the port 505 via the port 503 of the main branching unit 110, and light signals are outputted from the port 506 or 507 determined for each wavelength will be described.

A WDM signal including light signals of wavelengths a, b and c that has been transmitted from the terminal station A 101 is transmitted to the port 505 of the sub branching unit 120 via the ports 501 and 503 of the main branching unit 110. The sub branching unit 120 splits the WDM signal received from the main branching unit 110 into signals of respective wavelengths. FIG. 2 indicates an example where light signals of wavelength a and wavelength c are destined for the terminal station B 102, and a light signal of wavelength b is destined for the terminal station C 103. The sub branching unit 120 receives the WDM signal from the main branching unit 110 at the port 505. The sub branching unit 120 outputs the light signal of wavelength a and the light signal of wavelength c that are destined for the terminal station B 102 to the port 504 of the main branching unit 110 from the port 506. Further, to the terminal station C 103, the sub branching unit 120 outputs the light signal of wavelength b that is destined for the terminal station C 103 from the port 507. The light signal of wavelength a and the light signal of wavelength c inputted from the port 506 of the sub branching unit 120 to the port 504 of the main branching unit 110 are outputted from the port 502 of the main branching unit 110 to the terminal station B 102. The block having the function by which a light signal is outputted from a port determined for each wavelength in the sub branching unit 120 that have been described in FIG. 1 and FIG. 2 may be called "separating unit".

Figure 3:
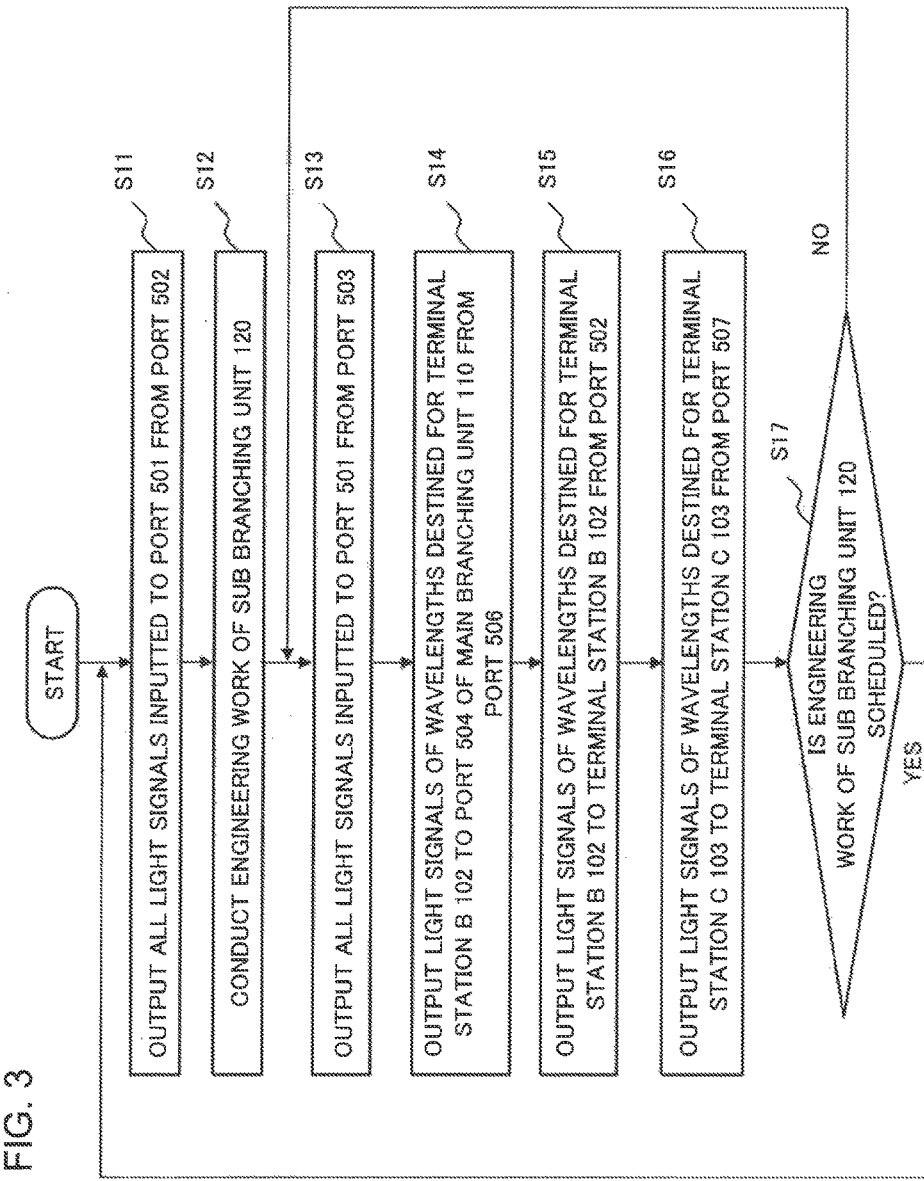
FIG. 3 is a flow chart illustrating an example of operations of an extended branching device 100 of the first example embodiment.

FIG. 3 is a flow chart illustrating an example of operations of the extended branching device 100 of the present example embodiment. When the sub branching unit 120 is not connected, the main branching unit 110 sets inner routes in such a way that all WDM signals inputted to the port 501 are outputted from the port 502 (Step S11 of FIG. 3). In the state that Step S11 has been carried out, the sub branching unit 120 is separated from the main branching unit 110, and engineering work for the sub branching unit 120 is conducted (Step S12).

When the engineering work of the sub branching unit 120 ends, and the sub branching unit 120 is connected to the main branching unit 110, the main branching unit 110 sets the inner routes in such a way that light signals of all wavelengths inputted to the port 501 are outputted from the port 503 (S13). The light signals outputted from the port 503 are outputted to the port 505 of the sub branching unit 120. The sub branching unit 120 outputs light signals of the wavelengths destined for the terminal station B 102 to the port 504 of the main branching unit 110 from the port 506 (S14). The main branching unit 110 outputs the light signals inputted to the port 504 to the terminal station B 102 from the port 502 (S15). On the other hand, the sub branching unit 120 outputs light signals of the wavelength destined for the terminal station C 103 to the terminal station C 103 from the port 507 (S16). By the procedure of above mentioned Steps S13-S16, a WDM signal transmitted from the terminal station A 101 is split by the extended branching device 100 and transmitted to the terminal station B 102 and the terminal station C 103 by predetermined wavelengths. Note that, Steps S13-S16 do not limit order of processing of a light signal. The processing of a light signal indicated in Steps S13-S16 is performed in parallel.

When engineering work of the sub branching unit 120 is scheduled for function change of the sub branching unit 120 in operation (S17: Yes), the flow returns to Step S11. In Step S11, the main branching unit 110 is controlled in such a way that all light signals inputted to the port 501 of the main branching unit 110 are outputted from the port 502. As a result, a WDM signal which the terminal station A 101 has transmitted passes only the main branching unit 110, and is transmitted to the terminal station B 102. When engineering work is not begun, that is, in a usual operation state (S17: No), the operations of Steps S13-S16 continue.

Thus, since the main branching unit 110 and the sub branching unit 120 are being separated from each other, the extended branching device 100 of the present example embodiment can add the terminal station C 103 only by engineering work of the sub branching unit 120 without stopping the main branching unit 110. Accordingly, even when the extended branching device 100 is installed in the bottom of the sea, all that is needed is to bring up the sub branching unit 120 at the time of addition work of the terminal station C 103. This enables suppression of engineering work cost.

The branching function of a WDM signal is included in the sub branching unit 120. For this reason, change of the branching and combining (add/drop) function of a WDM signal for each wavelength in the extended branching device 100, for example, can also be achieved by adjustment or replacement of the sub branching unit 120 only. Furthermore, in the extended branching device 100 of the present example embodiment, communication between the terminal station A 101 and the terminal station B 102 is maintained as illustrated in FIG. 1 even during engineering work of the sub branching unit 120, and, therefore, influence of the engineering work on communication is small.

That is, the extended branching device 100 of the first example embodiment exerts an effect of facilitating engineering work and reducing influence of the engineering work on communication.

Second Example Embodiment

In the second example embodiment, the extended branching device 100 described in the first example embodiment will be described based on a more detailed structure. In the example embodiments below, to a component having a function similar to that of the first example embodiment, the identical name and reference sign are attached, and description overlapping that of the first example embodiment will be omitted.

Figure 4:
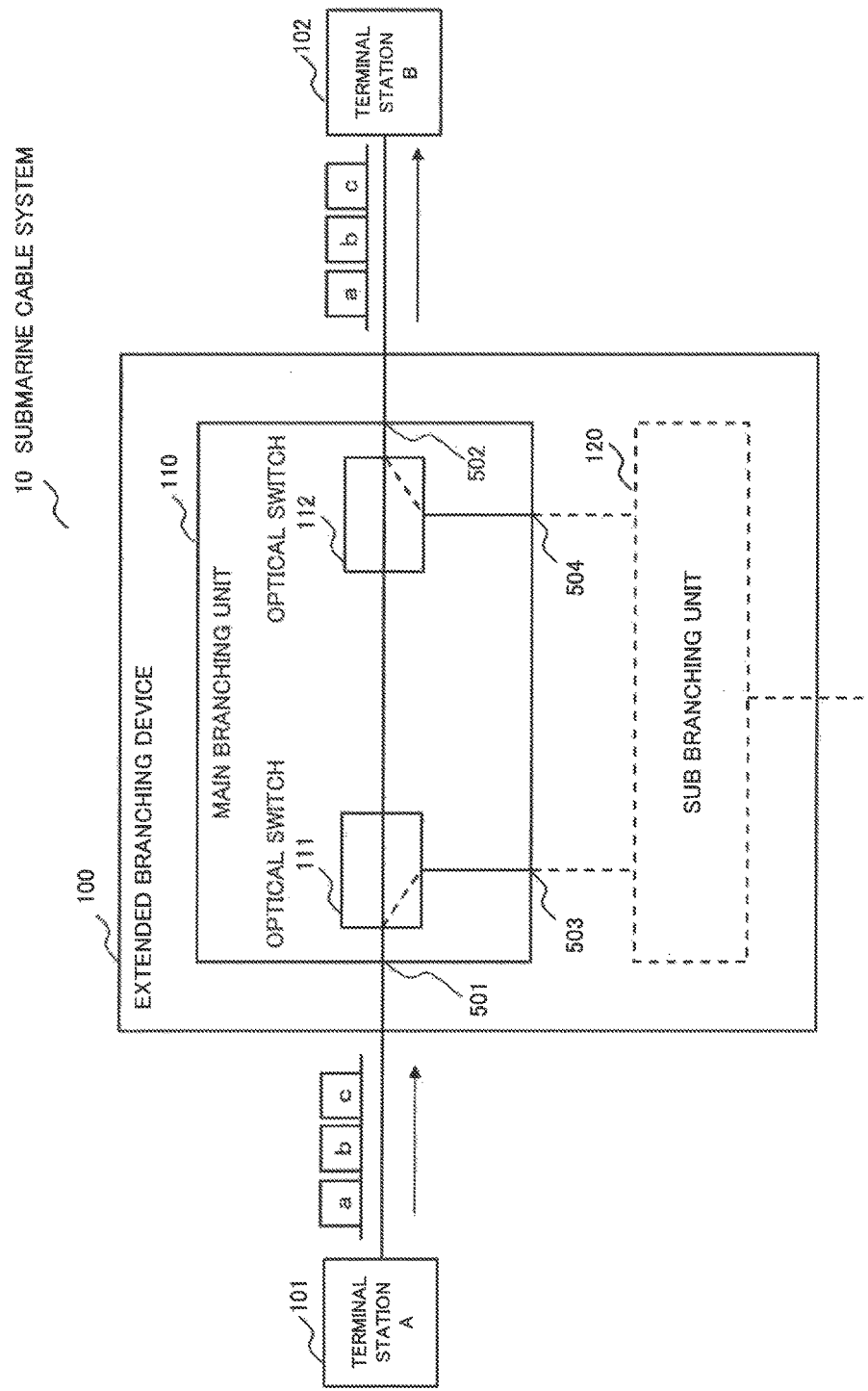
FIG. 4 is a block diagram illustrating an exemplary configuration of a submarine cable system 10 of a second example embodiment.

FIG. 4 is a block diagram illustrating an exemplary configuration of the submarine cable system 10 of the second example embodiment. The extended branching device 100 includes the main branching unit 110 and the sub branching unit 120. In this regard, however, FIG. 4 indicates a case where the sub branching unit 120 and the terminal station C 103 are not in operation. The main branching unit 110 illustrated in a FIG. 4 includes optical switches 111 and 112. Both the optical switches 111 and 112 are 1×2 optical switches each having one common port and two branching ports, and switch a connection destination of the ports 501 and 502 in the extended branching device 100. The common port of the optical switch 111 is connected to the terminal station A 101 via the port 501. The common port of the optical switch 112 is connected to the terminal station B 102 via the port 502. One of the branching ports of the optical switch 111 is connected to one of the branching ports of the optical switch 112. The other of the branching ports of the optical switch 111 is connected to the port 503. The other of the branching ports of the optical switch 112 is connected to the port 504.

When the main branching unit 110 and the sub branching unit 120 are not connected to each other, one of the branching ports of the optical switch 111 and one of the branching ports of the optical switch 112 are connected directly. As a result, WDM signals inputted from the port 501 are outputted to the terminal station B 102 via the optical switches 111 and 112 and the port 502.

Figure 5:
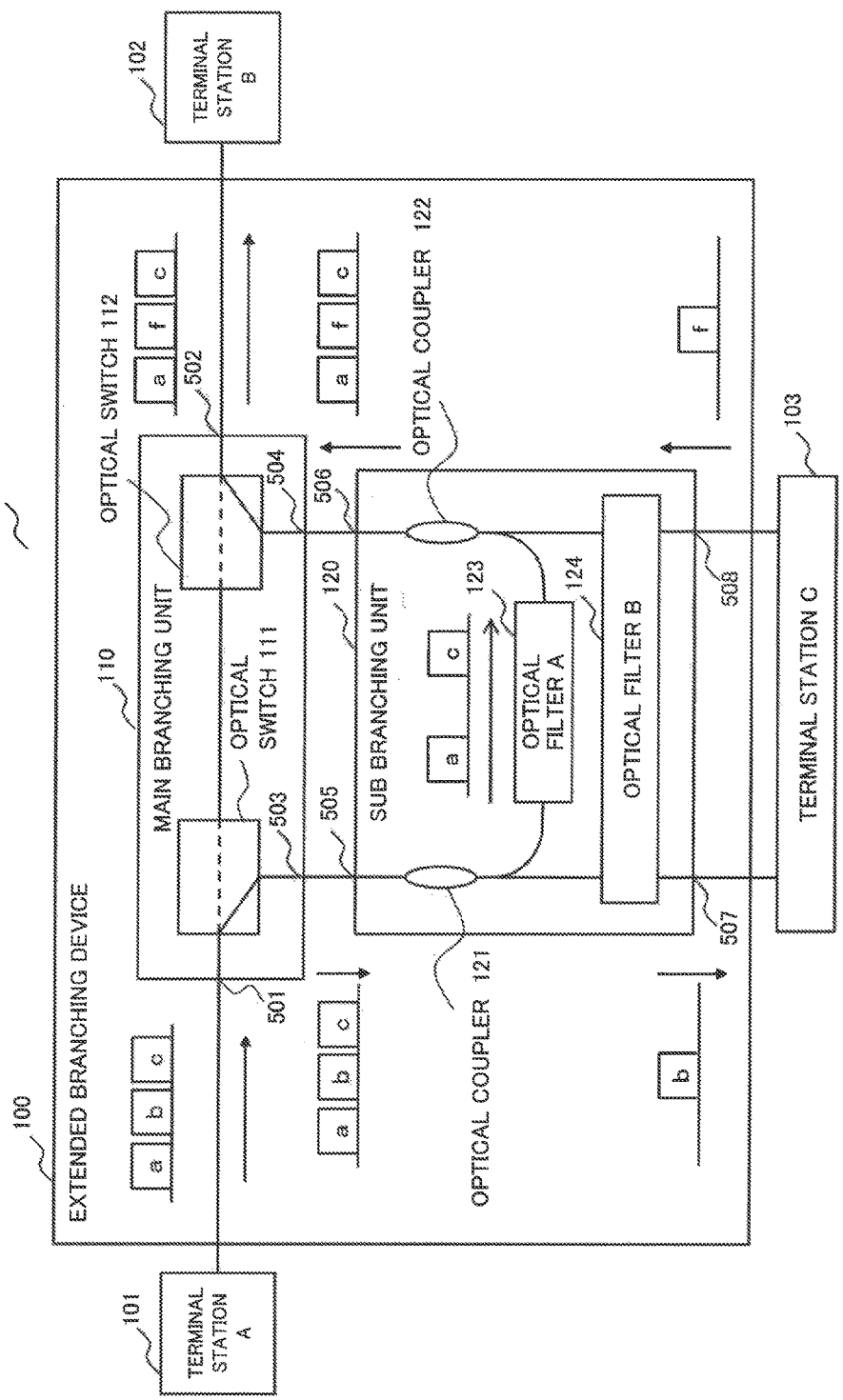
FIG. 5 is a block diagram illustrating an exemplary configuration of the submarine cable system 10 of the second example embodiment.

FIG. 5 is also a block diagram illustrating an exemplary configuration of the submarine cable system 10 of the second example embodiment. FIG. 5 indicates a case where the sub branching unit 120 and the terminal station C 103 are in operation. In FIG. 5, the port 503 of the main branching unit 110 and the port 505 of the sub branching unit 120 are connected, and the port 504 of the main branching unit 110 and the port 506 of the sub branching unit 120 are connected.

The sub branching unit 120 includes optical couplers 121 and 122, an optical filter A 123 and an optical filter B 124. As the optical couplers 121 and 122, optical directional couplers may be used. The optical couplers 121 and 122 split light signals inputted from the port 505 and the port 506 at a predetermined branching ratio (1:1, for example), respectively. One of the light signals split by each of the optical couplers is inputted to the optical filter A 123, and the other is inputted to the optical filter B 124. As the optical filter A 123 and the optical filter B 124, dielectric multilayer films may be used. The ports 507 and 508 are connected to the terminal station C 103. The terminal station C 103 receives a light signal outputted from the port 507 of the sub branching unit 120. A light signal which the terminal station C 103 transmits is inputted to the sub branching unit 120 from the port 508.

Hereinafter, a case where a WDM signal which the terminal station A 101 transmits is split and transmitted to the terminal station B 102 and the terminal station C 103 in the extended branching device 100 will be described. Specifically, a WDM signal which the terminal station A 101 transmits is inputted to the sub branching unit 120 via the ports 501, 503 and 505.

One of the WDM signals split by the optical coupler 121 is inputted to the optical filter A 123. The optical filter A 123 passes a light signal of wavelength a and a light signal of wavelength c and stops a light signal of wavelength b. Wavelength a and wavelength c are the wavelengths of light signals to be transmitted from the terminal station A 101 to the terminal station B 102. The optical filter B 124 passes a light signal of wavelength b which is included in the other of the light signals split by the optical coupler 121, and outputs it from the port 507. Wavelength b is the wavelength of light signals transmitted from the terminal station A 101 to the terminal station C 103. The optical filter B 124 stops a light signal of wavelength a and a light signal of wavelength c. The optical filter B 124 also passes a light signal of wavelength f of the same wavelength band as wavelength b transmitted from the terminal station C 103 to the terminal station B 102. A light signal of wavelength f is inputted from the port 508 to the optical filter B 124 and is outputted to the optical coupler 122.

In the optical coupler 122, the light signal of wavelength a and the light signal of wavelength c which have passed the optical filter A 123 are combined with the light signal of wavelength f which the terminal station C 103 has transmitted. The light signal of combined wavelengths a, f and c is outputted to the terminal station B 102 via the ports 506, 504 and 502.

The extended branching device 100 having the structure illustrated in FIG. 5 may input a WDM signal transmitted by the terminal station B 102 to the sub branching unit 120 via the ports 502, 504 and 506. By making a WDM signal propagate by such route, the sub branching unit 120 can make the WDM signal inputted from the terminal station B 102 split to the terminal station A 101 and the terminal station C 103 based on the specifications of the optical filter A 123 and the optical filter B 124.

The optical filter A 123 may alternatively pass light of one or more wavelength bands including wavelength a or wavelength c. The optical filter B 124 may alternatively pass light of a wavelength band including wavelength b and wavelength f. In this case, the wavelengths of the wavelength band including wavelength a, the wavelength band including wavelength b and the wavelength band including wavelength c do not overlap each other.

In the submarine cable system 10 illustrated in FIG. 5, the terminal station A 101, the terminal station B 102, and the terminal station C 103 are being connected and operated. When engineering work such as replacement of the sub branching unit 120 or the like is needed in this state, operations of the system is as follows. When the main branching unit 110 and the sub branching unit 120 are separated for the engineering work, the optical switches 111 and 112 are controlled in such a way that the port 501 and the port 502 are connected inside the main branching unit 110. As a result, communication between the terminal station A 101 and the terminal station B 102 does not to go through the sub branching unit 120 anymore, and, therefore, the communication between the terminal station A 101 and the terminal station B 102 would not be shut down for a long time during an engineering work period of the sub branching unit 120. Note that, the port 501 and the port 502 may be connected to each other inside the main branching unit 110 before separation of the main branching unit 110 and the sub branching unit 120.

When engineering work of the sub branching unit 120 ends, the ports 503 and 504 of the main branching unit 110 and the ports 505 and 506 of the sub branching unit 120 are connected as illustrated in FIG. 5. The optical switch 111 is controlled, after the connection of the main branching unit 110 and the sub branching unit 120, in such a way that the port 501 and the port 503 are connected, and the optical switch 112 is controlled in such a way that the port 502 and the port 504 are connected. That is, the route between the terminal station A 101 and the terminal station B 102 is switched in such a way that the route goes through the sub branching unit 120.

The optical switches 111 and 112 provided in the main branching unit 110 may be switched in a way being triggered by absence of a light signal from the sub branching unit 120 or absence of the power feeding from the sub branching unit 120. For example, the optical switches 111 and 112 may have a monitoring circuit for detecting presence or absence of a light signal or presence or absence of power feeding in the port 504. When a light signal is received from the sub branching unit 120 or the main branching unit 110 receives the power feeding from the sub branching unit 120, the monitoring circuit switches the optical switches 111 and 112 to the side of the port 503 and the port 504 (that is, the side of the sub branching unit 120). Then, when a light signal from the sub branching unit 120 is cut off or power feeding is cut off, the monitoring circuit switches the optical switches 111 and 112 in such a way that the port 501 and the port 502 are connected directly as illustrated in FIG. 4.

The optical switches 111 and 112 may have a mechanism to connect the port 501 and the port 502 directly in a case where the main branching unit 110 is not receiving power feeding or when a control signal does not exist. With such structure, even if power feeding to the sub branching unit 120 is lost as a result of separating the main branching unit 110 and the sub branching unit 120 at the time of engineering work, the terminal station A 101 and the terminal station B 102 are connected automatically in such a way that only the main branching unit 110 is interposed therebetween. In this case, the main branching unit 110 does not need power supply for the optical switches 111 and 112. Then, when the main branching unit 110 and the sub branching unit 120 are connected after the end of engineering work, the terminal station A 101 and the terminal station B 102 are connected via the sub branching unit 120 again.

Figure 6:
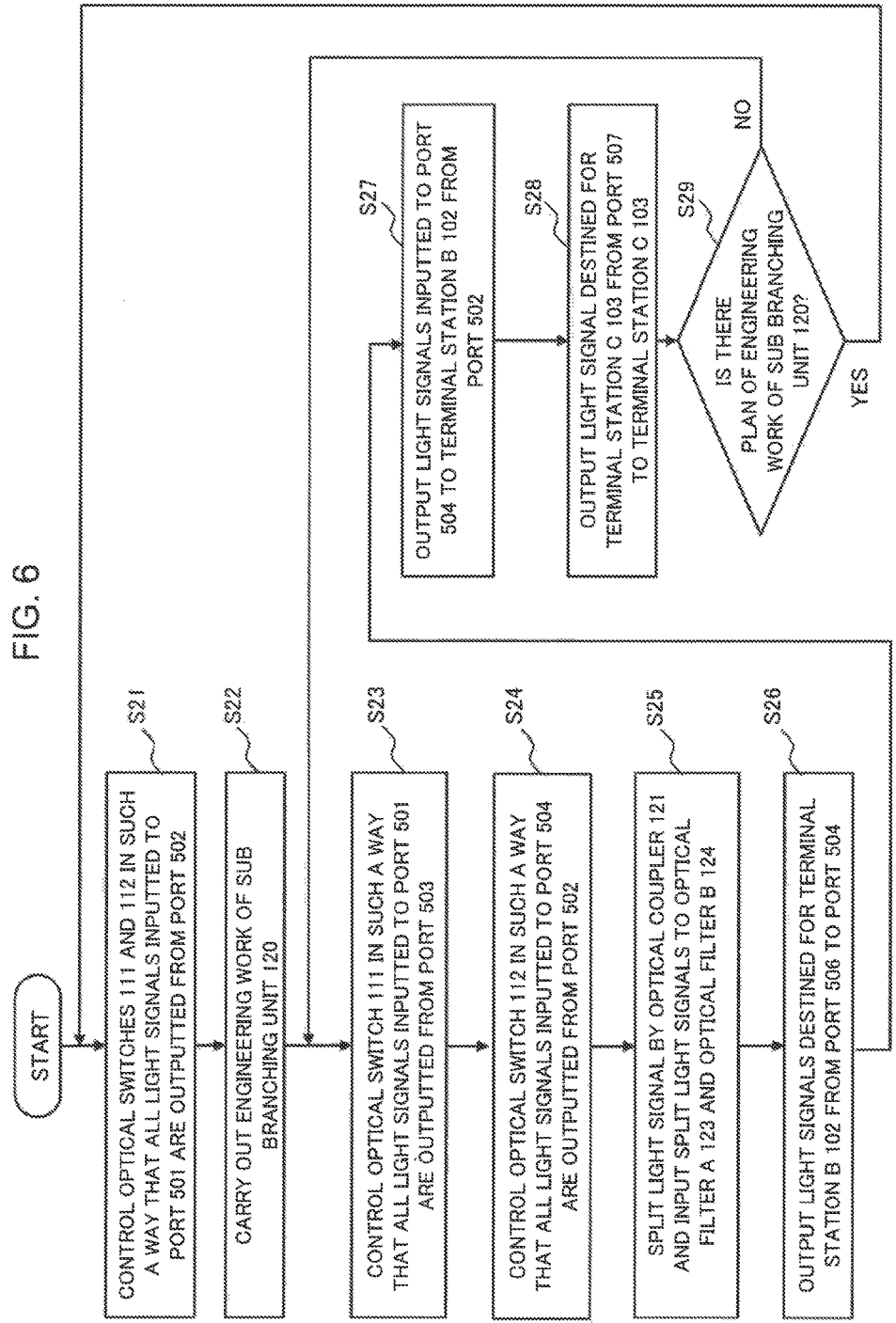
FIG. 6 is a flow chart illustrating an example of operations of an extended branching device 100 of the second example embodiment.

FIG. 6 is a flow chart illustrating an example of operations of the extended branching device 100 of the present example embodiment. When the sub branching unit 120 is not being connected, the optical switches 111 and 112 are controlled in such a way that light signals of all wavelengths inputted from the terminal station A 101 via the port 501 are outputted to the terminal station B 102 via the port 502 (Step S21 of FIG. 6). The sub branching unit 120 is separated from the main branching unit 110 in the state that Step S21 has been carried out, and engineering work of the sub branching unit 120 is carried out (S22).

When the engineering work of the sub branching unit 120 ends, and the sub branching unit 120 is connected to the main branching unit 110, the main branching unit 110 controls the optical switch 111 in such a way that light signals of all wavelengths inputted from the port 501 are outputted from the port 503 (S23). The main branching unit 110 controls the optical switch 112 in such a way that light signals of all wavelengths inputted from the port 504 may be outputted from the port 502 (S24).

The sub branching unit 120 splits a light signal received from the main branching unit 110 by the optical coupler 121 and inputs split light signals to the optical filter A 123 and the optical filter B 124 (S25). The optical filter A 123 passes light signals of the wavelength destined for the terminal station B 102. The sub branching unit 120 outputs the light signals destined for the terminal station B 102 from the port 506 to the port 504 of the main branching unit 110 (S26). The main branching unit 110 outputs the light signals, which have been inputted from the sub branching unit 120 to the port 504, to the terminal station B 102 from the port 502 (S27).

The optical filter B 124 passes light signals of the wavelength destined for the terminal station C 103. The sub branching unit 120 outputs the light signal destined for the terminal station C 103 from the port 507 to the terminal station C 103 (S28).

When there is a plan of engineering work of the sub branching unit 120 (S29: Yes), the flow returns to Step S21, and the optical switches 111 and 112 are controlled in such a way that a WDM signal transmitted from the terminal station A 101 is transmitted to the terminal station B 102 only via the main branching unit 110. When engineering work is not resumed, that is, when the usual operation is in progress, the operations of Steps S23-S28 continue (S29: No).

By repeating the procedure of the above-mentioned Steps S23-S28, the submarine cable system 10 is operated. Note that, Steps S23-S28 do not limit order of the processing of light signals. The processing of a WDM signal received from the terminal station A 101 in the extended branching device 100 indicated by Steps S23-S28 is performed in parallel.

An extended branching device on which the branching function between terminal stations is fixed may be called a fixed optical add drop multiplexer (Fixed OADM). An OADM whose branching function can be changed may be called a reconfigurable OADM (ROADM). Then, the branching function of such OADM can be implemented on the sub branching unit 120 of the extended branching device 100.

After the submarine cable system 10 has become operational, it is conceivable a case where the branching function of the extended branching device 100 having the function of Fixed OADM is changed and a case where Fixed OADM is replaced with ROADM. According to the present example embodiment, in such cases, change of the branching function of Fixed OADM and replacement to ROADM is possible just by bringing up only the sub branching unit 120 from the bottom of the sea and replacing it. Then, even during a period when engineering work of the sub branching unit 120 is being carried out, the terminal station A 101 and the terminal station B 102 can communicate by control of the switches 111 and 112. As a result, influence of the engineering work on communication is reduced.

Furthermore, in recent years, an ROADM device having a remote-control function of a communication path and optical filters having higher wavelength resolution have been also developed. According to the present example embodiment, it is also easy to improve functionality of the extended branching device 100 by replacing the sub branching unit 120 in operation with the sub branching unit 120 on which such highly functional device is mounted.

As it has been described above, the extended branching device 100 of the present example embodiment exerts an effect of facilitating engineering work and reducing influence of the engineering work on communication.

The reason of this is that, by separating the extended branching device 100 installed in the bottom of the sea into the main branching unit 110 and the sub branching unit 120, it is possible to perform functional extension of the extended branching device 100 by bringing up only the sub branching unit 120 for replacement or repair. When the sub branching unit 120 is not connected to the main branching unit 110, the extended branching device 100 of the present example embodiment controls the optical switches 111 and 112 in such a way that the terminal station B 102 and the terminal station A 101 are connected in the main branching unit 110. As a result, communication between the terminal station A 101 and the terminal station B 102 is also maintained during engineering work relating to the terminal station C 103. In addition, compared with a case where the whole body of the extended branching device 100 is brought up and replaced, all that is needed is to bring up only the sub branching unit 120 in the extended branching device 100 of the present example embodiment, and, thus, engineering work for replacement will be of a small scale, and, in addition, expense of engineering work can be reduced.

Third Example Embodiment

In the first and second example embodiments, one sub branching unit 120 is connected to one main branching unit 110. In the third example embodiment, a configuration with which two sub branching unit 120 are connected to one main branching unit 110 will be described.

Figure 7:
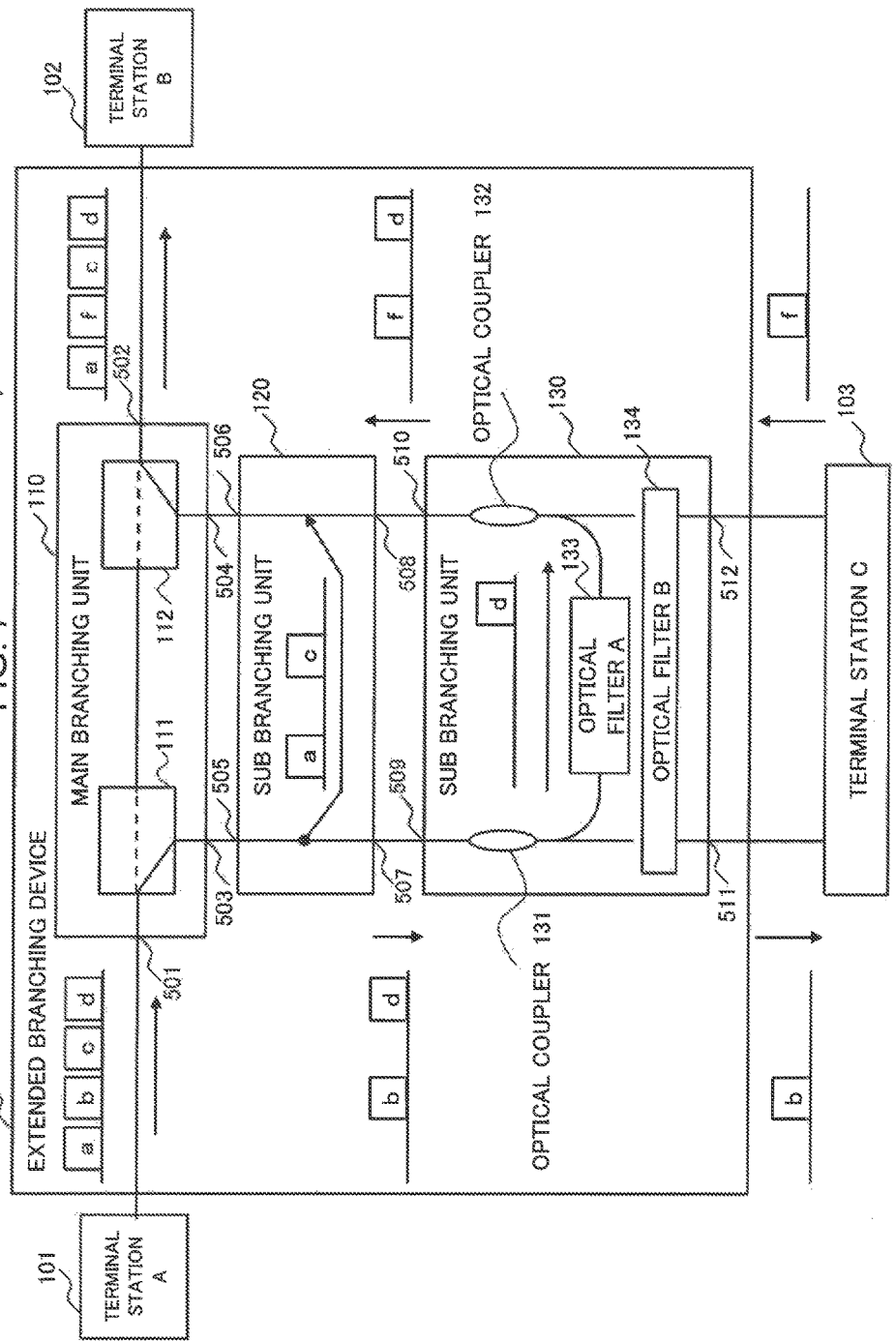
FIG. 7 is a block diagram illustrating an exemplary configuration of a submarine cable system 20 of a third example embodiment.

FIG. 7 is a block diagram illustrating an exemplary configuration of the submarine cable system 20 of the third example embodiment of the present invention. The submarine cable system 20 includes an extended branching device 200 instead of the extended branching device 100 described in the first and second example embodiments. In addition to the main branching unit 110 and the sub branching unit 120 described in the first and second example embodiments, the extended branching device 200 includes another sub branching unit 130. The sub branching unit 130 has ports 509-512, and is cascade-connected to the sub branching unit 120. That is, the ports 509 and 510 of the sub branching unit 130 are connected to the port 507 and the port 508 of the sub branching unit 120 respectively, and the port 511 and 512 of the sub branching unit 130 are connected to the terminal station C 103. Since the structure of the sub branching unit 120 is similar to that of the second example embodiment except for the specification of the optical filter A 123 and the optical filter B 124, the sub branching unit 120 is described simply in FIG. 7.

The sub branching unit 130 has a structure similar to that of the sub branching unit 120 basically. That is, the ports 509-512 of the sub branching unit 130 correspond to the ports 505-508 of the sub branching unit 120, respectively. The sub branching unit 130 includes optical couplers 131 and 132, an optical filter A 133 and an optical filter B 134. These correspond to the optical couplers 121 and 122, and the optical filter A 123 and the optical filter B 124 of the sub branching unit 120, respectively. The sub branching unit 130 outputs, to the port 510 or the port 511, a WDM signal inputted to the port 509 based on the specifications of the optical filter A 133 and the optical filter B 134. The specifications of each optical filter of the sub branching units 120 and 130 will be described later.

The sub branching unit 130 combines, by the optical coupler 132, a light signal transmitted by the terminal station C 103 and inputted from the port 512 and a light signal that has passed the optical filter A 133, and outputs the combined signal from the port 510. The light signal outputted from the port 510 is outputted to the terminal station B 102 via the ports 508 and 506 of the sub branching unit 120 and the ports 504 and 502 of the main branching unit 110.

In the present example embodiment, the terminal station A 101 transmits a WDM signal of four wavelengths, wavelengths a, b, c, and d. The optical filter A 123 of the sub branching unit 120 passes a light signal of wavelength a and a light signal of wavelength c, and stops a light signal of wavelength b and a light signal of wavelength d. The optical filter B 124 of the sub branching unit 120 passes a light signal of wavelength b and a light signal of wavelength d, and stops a light signal of wavelength a and a light signal of wavelength c. The light signal of wavelength b and the light signal of wavelength d are outputted from the port 507 of the sub branching unit 120. Before the sub branching unit 130 is connected, the terminal station C 103 was connected to the port 507 and the port 508 of the sub branching unit 120, and the terminal station C 103 was receiving light signals of wavelength b and light signals of wavelength d.

Here, it is possible to change the destination of the light signal of wavelength d to the terminal station B 102 from the terminal station C 103 by adding the sub branching unit 130 between the sub branching unit 120 and the terminal station C 103. An optical filter A 133 passes the light signal of wavelength d and stops the light signal of wavelength b. An optical filter B 134 passes the light signal of wavelength b, and stops the light signal of wavelength d. As a result, the light signal of wavelength d inputted to the port 509 of the sub branching unit 130 is outputted to the port 508 of the sub branching unit 120 via the optical filter A 133 and the port 510. Then, the light signal of wavelength d is received by the terminal station B 102 via the sub branching unit 120 and the main branching unit 110. The light signal of wavelength b inputted to the port 509 of the sub branching unit 130 is outputted from the port 511 to the terminal station C 103. Thus, by connecting the sub branching unit 130 to the sub branching unit 120, the specification of the extended branching device 200 is changed in such a way that the terminal station of the destination of the light signal of wavelength d is changed to the terminal station B 102 from the terminal station C 103. That is, the extended branching device 200 having such structure can change the specification of the extended branching device 200 without replacing the existing sub branching unit 120.

When change of the terminal station of the destination of the light signal of wavelength d is to be achieved by engineering work of the sub branching unit 120, the route of the light signal of wavelength a and the light signal of wavelength c which pass the sub branching unit 120 needs to be changed such that only the main branching unit 110 is passed through. By change of such route, communication between the terminal station A 101 and the terminal station B 102 also becomes possible even during the engineering work period of the sub branching unit 120, as it has been described in the first and second example embodiments. However, at the time of switching of the routes by the optical switches 111 and 112, there is possibility that a very-short-time shutdown (instantaneous shutdown) may occur to the light signal of wavelength a and the light signal of wavelength c.

In contrast, in the present example embodiment, a state of the optical switches 111 and 112 does not change during a period of engineering work for adding the sub branching unit 130. Accordingly, the light signal of wavelength a and the light signal of wavelength c transmitted to the main branching unit 110 via the sub branching unit 120 are not influenced by the engineering work for adding the sub branching unit 130. As a result, the extended branching device 200 of the third example embodiment exerts, in addition to the same effect as that of the first and second example embodiments, an effect of preventing the occurrence of the instantaneous shutdown associated with switching of the optical switches at the time of addition of the sub branching unit 130.

Although the present invention has been described with reference to the example embodiments above, the present invention is not limited to the above-mentioned example embodiments. Various changes which a person skilled in the art can understand within the scope of the present invention can be performed in the composition of the present invention and details.

The extended branching devices 100 and 200 of each example embodiment may include a CPU and a memory. The memory is a semiconductor memory and a magnetic disk device, for example, and records a program of the CPU. The CPU is a central processing unit, and, by executing the program which is stored in the memory, the function of the extended branching devices 100 and 200 including optical switches are achieved. The CPU and the memory are included inside the main branching unit 110, for example, and each unit of the extended branching devices 100 and 200 is controlled. Note that, an optical switch may be switched by remote control from outside of the extended branching devices 100 and 200. The extended branching devices 100 and 200 may have a battery, and the battery may provide power to electric circuits of the extended branching devices 100 and 200 including a CPU and a memory.

In each of the example embodiments, a submarine cable system having a branching device installed on the bottom of the sea has been described. However, application of each of the example embodiments is not limited to a submarine cable system. For example, even when the structure of each example embodiment is applied to a communication system on land, an effect of facilitating engineering work and reducing influence on existing communication at the time of engineering work is obtained.

This application claims priority based on Japanese application Japanese Patent Application No. 2015-051828 filed on Mar. 16, 2015, the disclosure of which is incorporated herein in its entirety.

REFERENCE SIGNS LIST 10 and 20 Submarine cable system
100 and 200 Extended branching device 101 Terminal station A
102 Terminal station B
103 Terminal station C
110 Main branching unit
111 and 112 Optical switch
120 and 130 Sub branching unit
121, 122, 131 and 132 Optical coupler
123 and 133 Optical filter A
124 and 134 Optical filter B

The invention claimed is:

1. A branching apparatus, comprising:
a first branching circuit configured to receive an optical signal from a first trunk station, and selectively transfer the optical signal to a second trunk station side or a branch station side;
a second branching circuit configured to split the optical signal into a first split signal and a second split signal, and filter the first split signal; and
a third branching circuit configured to split the second split signal into a third split signal and a fourth split signal, filter the third split signal, and transfer the fourth split signal to a branch station,
wherein the first branching circuit transfers a wavelength multiplexed signal including the first split signal and the third split signal to a second trunk station.

2. The branching apparatus according to claim 1, wherein
the first branching circuit comprises a first port coupled to the first trunk station, a second port coupled to the second trunk station, a third port, a fourth port, and a switch to couple the first port with one of the second port and the third port and couple the second port with the fourth port;
the second branching circuit comprises a fifth port coupled to the third port, a sixth port coupled to the fourth port, a seventh port coupled to the branch station, and a first separating circuit configured to output, from the sixth port, the first split signal of a first wavelength among the optical signal inputted from the fifth port and output, from the seventh port, the second split signal of a second wavelength among the optical signal inputted from the fifth port,
and that is configured to be separable from the first branching circuit; and
the third branching circuit is disposed between the second branching circuit and the branch station, and comprises a ninth port coupled to the seventh port, a tenth port coupled to an eighth port, an eleventh port coupled to the branch station, and a second separating circuit configured to output from the tenth port the third split signal of a third wavelength among the optical signal inputted from the ninth port and output from the eleventh port the fourth split signal of a fourth wavelength among the optical signal inputted from the ninth port, and that is configured to be separable from the first branching circuit and the second branching circuit.

3. The branching apparatus according to claim 2, wherein
the switch operates in one of
a first state in which the first port and the second port are coupled, and
a second state in which the first port is coupled to the third port and the second port is coupled to the fourth port.

4. The branching apparatus according to claim 1, wherein
the switch comprises a first optical switch and a second optical switch that are 1×2 optical switches each having one common port and two branching ports,
the common port of the first optical switch is coupled to the first port,
the common port of the second optical switch is coupled to the second port,
one of the branching ports of the first optical switch is coupled to one of the branching ports of the second optical switch,
another of the branching ports of the first optical switch is coupled to the third port,
another of the branching ports of the second optical switch is coupled to the fourth port,
in the first state, the first and second optical switches are controlled in such a way that the common port of the first optical switch is coupled to the common port of the second optical switch, and,
in the second state, the first and second optical switches are controlled in such a way that the common port of the first optical switch is coupled to the another of the branching ports of the first optical switch and the common port of the second optical switch is coupled to the another of the branching ports of the second optical switch.

5. The branching apparatus according to claim 4, wherein
the first separating circuit comprises a first optical coupler, a first optical filter that passes only the first wavelength, and a second optical filter that passes only the second wavelength,
the first optical coupler splits the optical signal inputted from the fifth port into the first split signal and the second split signal, outputs the first split signal to the first optical filter and outputs the second split signal to the second optical filter,
the first optical filter outputs from the sixth port the first split signal of the first wavelength that has passed therethrough, and
the second optical filter outputs from the seventh port the second split signal of the second wavelength that has passed therethrough.

6. The branching apparatus according to claim 5, wherein
the second branching circuit further comprises
an eighth port for receiving input of a light signal outputted from the branch station; and
a second optical coupler for combining the first split signal of the first wavelength having passed the first optical filter and a light signal inputted from the eighth port, and for outputting a combined light signal from the sixth port.

7. The branching apparatus according to claim 3, wherein
the first separating circuit comprises a first optical coupler, a first optical filter that passes only the first wavelength, and a second optical filter that passes only the second wavelength,
the first optical coupler splits the optical signal inputted from the fifth port into the first split signal and the second split signal, outputs the first split signal to the first optical filter and outputs the second split signal to the second optical filter,
the first optical filter outputs from the sixth port the first split signal of the first wavelength that has passed therethrough, and the second optical filter outputs from the seventh port the second split signal of the second wavelength that has passed therethrough.

8. The branching apparatus according to claim 7, wherein the second branching circuit further comprises an eighth port for receiving input of a light signal outputted from the branch station; and a second optical coupler for combining the first split signal of the first wavelength having passed the first optical filter and a light signal inputted from the eighth port, and for outputting a combined light signal from the sixth port.

9. The branching apparatus according to claim 2, wherein the first separating circuit comprises a first optical coupler, a first optical filter that passes only the first wavelength, and a second optical filter that passes only the second wavelength, the first optical coupler splits the optical signal inputted from the fifth port into the first split signal and the second split signal, outputs the first split signal to the first optical filter, and outputs the second split signal to the second optical filter, the first optical filter outputs from the sixth port the first split signal of the first wavelength that has passed therethrough, and the second optical filter outputs from the seventh port the second split signal of the second wavelength that has passed therethrough.

10. The branching apparatus according to claim 9, wherein the second branching circuit further comprises an eighth port for receiving input of a light signal outputted from the branch station; and a second optical coupler for combining the first split signal of the first wavelength having passed the first optical filter and a light signal inputted from the eighth port, and for outputting a combined light signal from the sixth port.

11. A communication system comprising:

the branching apparatus according to claim 2, wherein the first trunk station is coupled to the first port, the second trunk station is coupled to the second port, and the branch station is coupled to the eleventh port.

12. The branching apparatus according to claim 1, wherein the third branching circuit receives an additional signal from the branch station, and the first branching circuit transfers a wavelength multiplexed signal including the second split signal and the fourth split signal and the additional signal to the second trunk station.

13. The branching apparatus according to claim 1, wherein when at least one of the second branching circuit and the third branching circuit is disconnected from the first branching circuit, the first branching circuit is configured to output the optical signal to the second trunk station.

14. A branching method, comprising:

receiving an optical signal from a first trunk station;

splitting the optical signal into a first split signal and a second split signal;

filtering the first split signal;

splitting the second split signal into a third split signal and a fourth split signal;

filtering the third split signal;

transferring the fourth split signal to a branch station; and transferring a wavelength multiplexed signal including the first split signal and the third split signal to a second trunk station.

15. A non-transitory computer readable recording medium recording a program for causing a computer to perform a branching method comprising:

receiving an optical signal from a first trunk station;

splitting the optical signal into a first split signal and a second split signal;

filtering the first split signal;

splitting the second split signal into a third split signal and a fourth split signal;

filtering the third split signal;

transferring the fourth split signal to a branch station; and transferring a wavelength multiplexed signal including the first split signal and the third split signal to a second trunk station.

* * * * *

UNITED STATES PATENT AND TRADEMARK OFFICE
CERTIFICATE OF CORRECTION

PATENT NO. : 10,243,685 B2
APPLICATION NO. : 15/556518
DATED : March 26, 2019
INVENTOR(S) : Ryota Abe It is certified that error appears in the above-identified patent and that said Letters Patent is hereby corrected as shown below:

In the Claims

Column 13, Line 66; In Claim 4, delete "claim 1," and insert --claim 3,-- therefor Signed and Sealed this
Thirtieth Day of July, 2019

Andrei Iancu
*Director of the United States Patent and Trademark Office*